United States Patent
Oh et al.

(10) Patent No.: US 7,664,975 B2
(45) Date of Patent: *Feb. 16, 2010

(54) APPARATUS AND METHOD FOR CONTROLLING POWER OF MONITOR

(75) Inventors: Byung-hoon Oh, Seoul (KR); Hong-chul Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

This patent is subject to a terminal disclaimer.

(21) Appl. No.: 10/679,293

(22) Filed: Oct. 7, 2003

(65) Prior Publication Data

US 2004/0085308 A1    May 6, 2004

(30) Foreign Application Priority Data

Oct. 31, 2002    (KR)   ............... 10-2002-0067059
Nov. 5, 2002    (KR)   ............... 10-2002-0068086

(51) Int. Cl.
     *G06F 1/32*    (2006.01)
(52) U.S. Cl. ...................... 713/320; 713/330
(58) Field of Classification Search ......... 713/300–320, 713/323, 330, 324

See application file for complete search history.

(56) References Cited

U.S. PATENT DOCUMENTS

| | | | |
|---|---|---|---|
| 5,880,719 A | | 3/1999 | Kikinis |
| 5,961,647 A | * | 10/1999 | Kim et al. ............. 713/300 |
| 6,052,792 A | * | 4/2000 | Mensch, Jr. ........... 713/322 |
| 6,178,513 B1 | * | 1/2001 | Lee ....................... 713/300 |
| 6,223,283 B1 | * | 4/2001 | Chaiken et al. .......... 713/1 |
| 6,504,534 B1 | * | 1/2003 | Takase et al. ........... 345/211 |
| 2001/0020982 A1 | * | 9/2001 | Takeda et al. .......... 348/553 |
| 2003/0137502 A1 | * | 7/2003 | Lee ....................... 345/212 |
| 2003/0156106 A1 | * | 8/2003 | Byun ..................... 345/212 |

FOREIGN PATENT DOCUMENTS

| | | |
|---|---|---|
| KR | 1998-72134 | 10/1998 |
| KR | 1999-19943 | 6/1999 |
| KR | 2004-38177 | 5/2004 |

* cited by examiner

*Primary Examiner*—Dennis M. Butler
(74) *Attorney, Agent, or Firm*—Staas & Halsey LLP

(57) ABSTRACT

An apparatus and method for controlling the power of a monitor where the monitor can be automatically powered on and off according to the state of power of a PC. The apparatus includes a computer outputting a predetermined signal indicating whether the computer is powered on or off; and a monitor receiving the predetermined signal and powering on and off according to the predetermined signal.

9 Claims, 6 Drawing Sheets

APPARATUS AND METHOD FOR CONTROLLING POWER OF MONITOR

CROSS-REFERENCE TO RELATED APPLICATIONS

This application claims the benefit of Korean Application No. 2002-67059, filed Oct. 31, 2002 and Application No. 2002-68086, filed Nov. 5, 2002, in the Korean Intellectual Property Office, the disclosure of which is incorporated herein by reference.

BACKGROUND OF THE INVENTION

1. Field of the Invention

The present invention relates to an apparatus and method for controlling the power of a personal computer (PC) system, and, more particularly, to an apparatus and method for controlling the power of a monitor, the monitor being automatically powered on and off according to the state of power of a PC, without the need to separately and manually power the monitor on and off.

2. Description of the Related Art

In order to reduce the power consumed in a PC monitor, the power supplied to the monitor should be controlled as disclosed in U.S. Pat. No. 5,880,719.

FIG. 1 shows a typical configuration of a PC system. As shown in FIG. 1, a PC system is typically comprised of a PC 100, a monitor 101, and a serial cable for data communications between the PC 100 and the monitor 101.

In order to operate the PC system, a power switch 100-1 for the PC 100 and a power switch 101-1 for the monitor 101 are switched on, respectively. When the PC 100 is powered on, a video card (not shown) within the PC 100 operates to output video signals. The output video signals are transmitted to the monitor 101 through the serial cable. After using the PC system, the power switches 100-1 and 101-1 are switched off to turn the PC 100 and the monitor 101 off, respectively.

As described above, it is inconvenient for a user to use the typical PC system since the PC 100 and the monitor 101 must be respectively powered on to operate the PC system, and respectively powered off after using the PC system. Further, in a case where the user forgets to power off the monitor 101 while powering off the PC 100, a problem occurs in that a significant amount of power is consumed by the monitor 101, which is continuously powered on.

FIG. 2 is a block diagram of a conventional apparatus for controlling the power of a monitor in a PC system. The PC system shown in FIG. 2 includes a PC 200, a monitor 201, and a serial cable for allowing data communication between the PC 200 and the monitor 201. The monitor 201 includes a power supply 201-1 for supplying power to other blocks within the monitor 201, a control unit 201-2 for sensing signals from the serial cable and generating a power switching control signal to control the power supplied to the other blocks within the monitor 201, and first, second, and third switches 201-3, 201-4, and 201-5 for switching the power supplied from the power supply 201-1 among the other blocks within the monitor 201 under the control of the control unit 201-2.

Signals output from the PC 200, i.e., VGA signals, are transmitted to the monitor 201 through the serial cable. The control unit 201-2 receives the signals output from the PC 200, and outputs a power switching control signal to control the power supplied to the other blocks within the monitor 201 according to the state of power of the PC 200. However, in order to monitor the state of the PC 200, a certain amount of power should be continuously supplied to the control unit 201-2. That is, even in a DPMS (Display Power Management System) mode, i.e., a power saving mode of the PC 200, a certain amount of power for driving at least the control unit 201-2 should be supplied to the monitor 201. Accordingly, unless the plug of the monitor 201 is pulled out, the monitor 201 is continuously powered on, and thus, power is continuously consumed.

SUMMARY OF THE INVENTION

The present invention provides an apparatus and method for controlling the power of a monitor where the monitor can be automatically powered on and off according to the state of power of a PC without the need to separately and manually powering the monitor on and off.

Further, the present invention provides an apparatus and method for controlling the power of a monitor where the monitor can be powered on and off in response to a predetermined signal output from a PC according to the state of power of the PC so that the power consumed by the monitor can be minimized.

Additional aspects and/or advantages of the invention will be set forth in part in the description which follows and, in part, will be obvious from the description, or may be learned by practice of the invention.

According to an aspect of the present invention, there is provided an apparatus for controlling the power of a monitor, which includes a computer outputting a predetermined signal indicating whether the computer is powered on or off and a monitor receiving the predetermined signal and is powered on and off according to the predetermined signal.

The predetermined signal output from the computer may be a signal output from a predetermined pin of a video card that processes and transmits video signals to the monitor. In this respect, the predetermined signal is transmitted to the monitor whether the monitor is powered on or off, so that monitor information is readable.

The monitor may include a memory storing the monitor information; a control unit comparing a reference level with a level of the predetermined signal, detecting a state of power of the computer based on a result of the comparison, and outputting a monitor power control signal; and a power supply unit supplying or cutting off power to the monitor in accordance with the monitor power control signal output from the control unit.

The control unit outputs a first control signal to supply power to the monitor in response to the level of the predetermined signal being higher than the reference level, and the control unit outputs a second control signal to cut off power supplied to the monitor in response to the level of the predetermined signal being lower than the reference level.

According to another aspect of the present invention, there is provided a method of controlling the power of a monitor, which includes receiving a predetermined signal from a computer indicating whether the computer is powered on or off, and powering the monitor on and off according to the predetermined signal.

The predetermined signal output from the computer may be transmitted to the monitor whether the monitor is powered on or off, so that monitor information can be read.

Powering on and off of the monitor may further include detecting a level of the received predetermined signal; supplying power to the monitor in response to the level of the predetermined signal being higher than a reference level; and cutting off power supplied to the monitor in response to the level of the predetermined signal being lower than the reference level.

According to another aspect of the present invention, there is provided an apparatus for controlling power of a monitor, which includes a computer outputting a predetermined signal, in addition to data signals, indicating whether the computer is powered on or off and a monitor receiving the predetermined signal and the data signals, and powered on and off according to the predetermined signal.

The predetermined signal output from the computer may be output from a predetermined pin that is not used in a transmission line for data communication between the computer and the monitor, and the powering on and off of the monitor are controlled by the predetermined signal.

The monitor may be powered off when the predetermined signal is not received from the computer due to the computer being in a DPMS (Display Power Management System) mode or in a power off mode.

The monitor may be powered on in response to the monitor receiving the predetermined signal transmitted from the computer after the monitor has been powered off.

According to another aspect of the present invention, there is provided a method of operating a monitor that displays signals transmitted from a computer, including receiving a predetermined signal transmitted to the monitor from the computer indicating whether the computer is powered on or off, and powering the monitor on and off according to the predetermined signal.

The predetermined signal output from the computer may be output from a predetermined pin that is not used in a transmission line for data communication between the computer and the monitor, and the powering on and off of the monitor are controlled by the predetermined signal.

The monitor may be powered off when the predetermined signal is not received from the computer due to the computer being in a DPMS (Display Power Management System) mode or in a power off mode.

The monitor may be powered on in response to the monitor receiving the predetermined signal transmitted from the computer after the monitor has been powered off.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
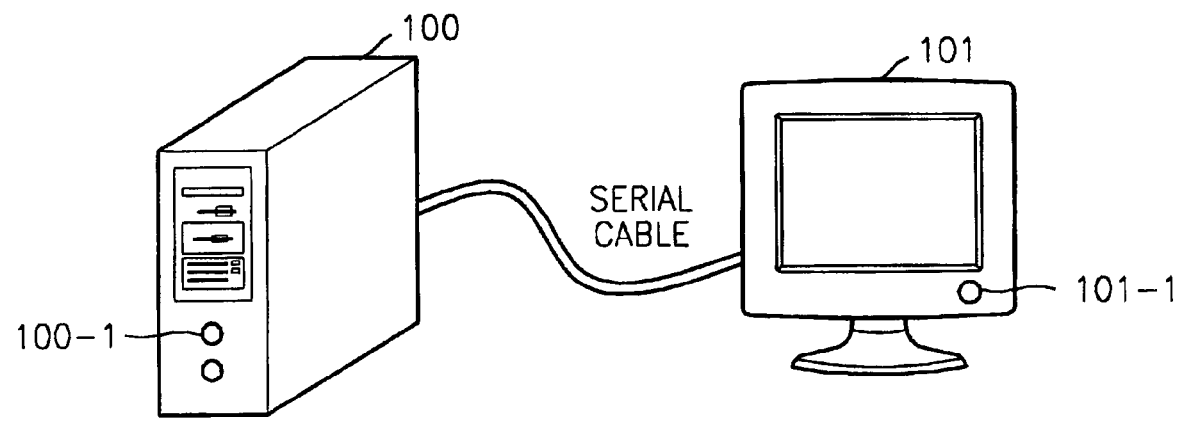
FIG. 1 shows a typical configuration of a PC system.
Figure 2:
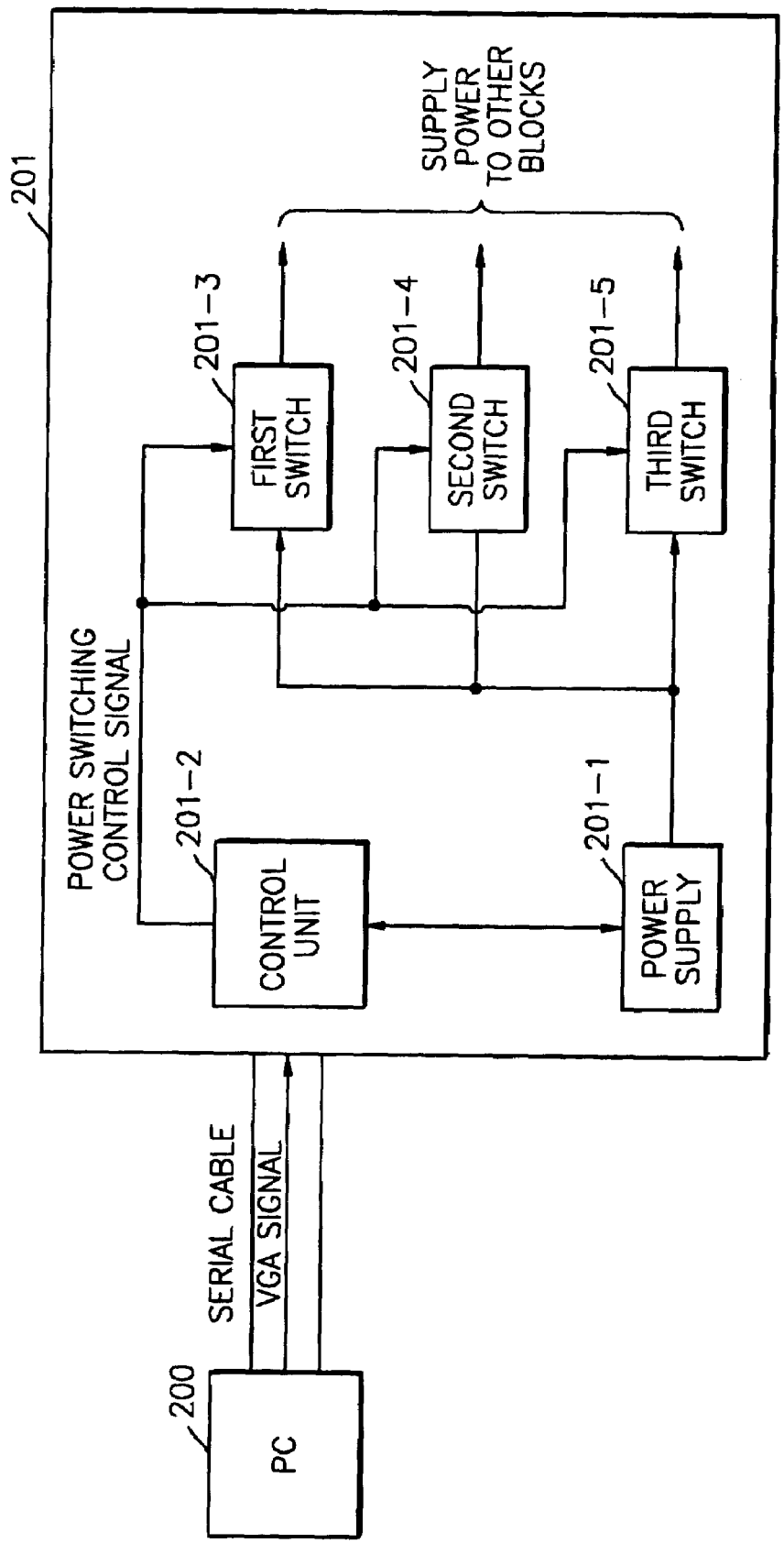
FIG. 2 is a block diagram of a PC system, including a monitor, adopting a conventional monitor power control apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
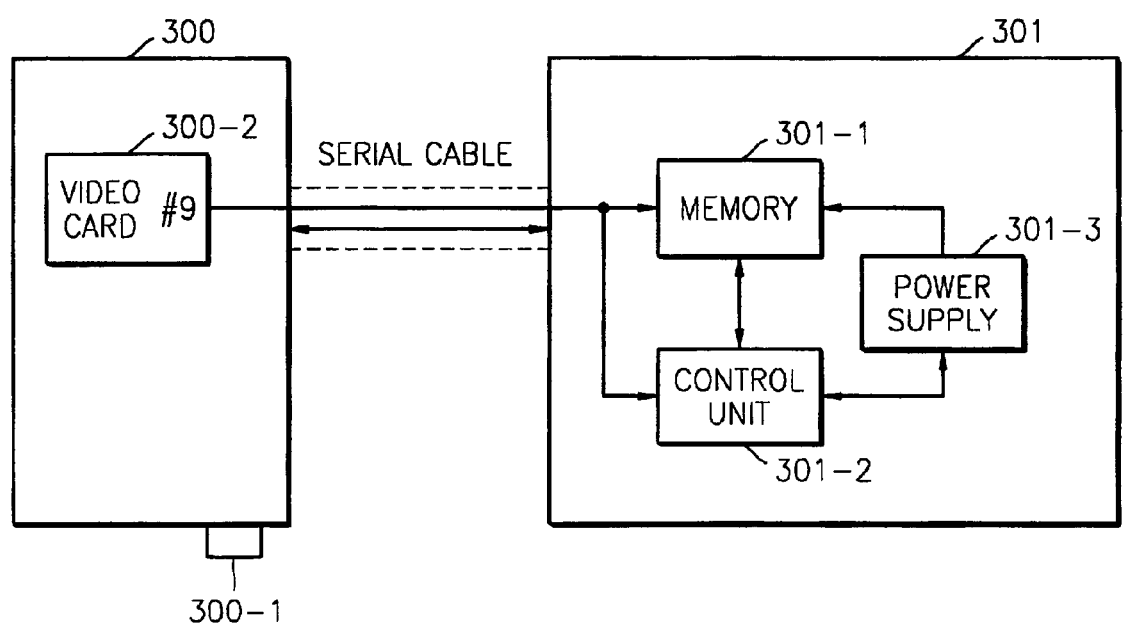
FIG. 3 is a block diagram of a PC system, including a monitor, adopting a monitor power control apparatus according to an embodiment of the present invention.

FIG. 3 is a block diagram of a PC system, including a monitor, adopting a monitor power control apparatus according to an embodiment of the present invention. The PC system is comprised of a PC 300, including a power switch 300-1 and a video card 300-2 outputting video signals, and a monitor 301, including a memory 301-1, a control unit 301-2, and a power supply 301-3. In addition, a serial cable is used for data communication between the PC 300 and the monitor 301.

A monitor power control apparatus according to an embodiment of the present invention will be described in detail with reference to FIG. 3.

The PC 300, in which WINDOWS 95® or WINDOWS 98® is embedded in this embodiment, although the present invention is applicable to any number of operating systems, has a PnP (Plug and Play) function. PnP connotes an instant start. When a hardware device is connected to an I/O (input/output) port of the PC, the hardware device can be instantly used without a separate configuration or installation operations. Since the monitor 301 is a kind of peripheral device connected to an I/O port of the PC 300, the monitor 301 can be immediately used, without any separate configurations to be made, due to the PnP function.

A predetermined pin of the video card 300-2 included in the PC 300 is used to connect the monitor 301 to an I/O port of the PC 300. When the PC 300 is powered on, a predetermined signal is output from the predetermined pin, e.g., the $9^{th}$ pin, of the video card 300-2 and transmitted to the monitor 301 via the serial cable. Here, the predetermined signal output from the $9^{th}$ pin of the video card 300-2 can be transmitted to the monitor 301 even when the monitor 301 is in a power off state. The memory 301-1 of the monitor 301 stores monitor information concerning such things as the manufacturer of the monitor, the resolution of the monitor, etc. The predetermined signal output from the $9^{th}$ pin of the video card 300-2 drives the memory 301-1 so that the monitor information stored in the memory 301-1 can be read. As described above, due to the PnP function, the PC 300 can read the monitor information even when the monitor 301 is in a power off state.

The predetermined signal output from the $9^{th}$ pin of the video card 300-2 is used to power the monitor 301 on or off by indicating the power status of the PC 300. The predetermined signal output from the $9^{th}$ pin of the video card 300-2 is transmitted to the monitor 301 when the PC is powered on. At the same time, video signals are output from the other pins of the video card 300-2 to display the monitor information via the monitor 301. If the PC 300 is powered on, the level of the predetermined signal output from the $9^{th}$ pin of the video card 300-2 is 5V, and if the PC 300 is powered off, the level of the predetermined signal is 0V, since no signal is output from the video card 300-2.

The control unit 301-2 senses the level of the predetermined signal output from the $9^{th}$ pin of the video card 300-2 and controls the power supply 301-3 to supply, or to stop supplying, power to the monitor 301. If the level of the predetermined signal output from the $9^{th}$ pin of the video card 300-2 is 5V, the control unit 301-2 determines that the PC 300 is powered on, and controls the power supply 301-3 to supply power. Then, the power is supplied from the power supply 301-3 to each block of the monitor 301. However, if the level of the predetermined signal output from the 9$^{th}$ pin of the video card 300-2 is 0V, the control unit 301-2 determines that the PC 300 is powered off, and controls the power supply 301-3 to stop supplying power. Then, the power supply 301-3 stops supplying power to each block of the monitor 301.

Figure 4:
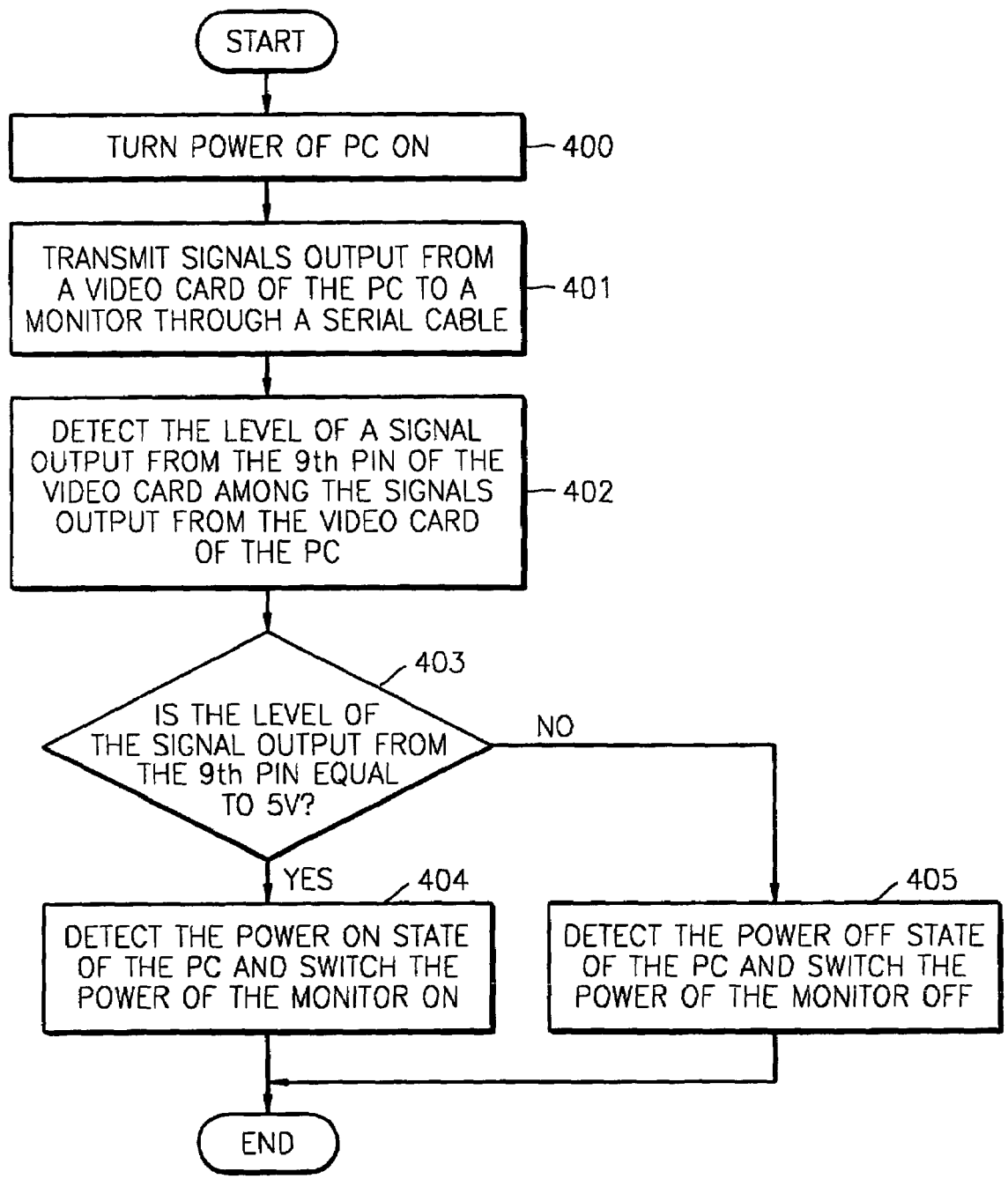
FIG. 4 is a flowchart of a method of controlling the power of a monitor according to an embodiment of the present invention.

FIG. 4 is a flowchart of a method of controlling the power of a monitor according to an embodiment of the present invention. The method includes switching on the power of the PC 300 to drive the PC 300 (400), transmitting signals output from the video card 300-2 of the PC 300 to the monitor 301 through a serial cable (401), the monitor 301 detecting the level of a signal output from the 9$^{th}$ pin of the video card 300-2 among the signals output from the video card 300-2 (402), determining whether the level of the signal output from the 9$^{th}$ pin of the video card 300-2 is 5V or 0V (403), if the level of the signal output from the 9$^{th}$ pin of the video card 300-2 is 5V, the monitor 301 determining that the PC 300 is powered on and switching on the power of the monitor 301 (404), and if the level of the signal output from the 9$^{th}$ pin of the video card 300-2 is 0V, the monitor 301 determining that the PC 300 is powered off and switching off the power of the monitor 301 (405).

The method of controlling the power of a monitor according to an embodiment of the present invention will be described in more detail with reference to FIGS. 3 and 4.

In this embodiment, it is assumed that the monitor 301 is initially powered off. In order to drive the PC 300, a user powers on the PC 300 by switching on the power switch 300-1 (400).

When the PC 300 is powered on by switching on the power switch 300-1, the video card 300-2 processes video signals and transmits them to the monitor 301 through the serial cable (401). Since the monitor 301 is powered off at this moment, the monitor 301 does not operate even when the video signals output from the video card 300-2 are transmitted to the monitor 301. However, the power of the monitor 301 can be turned on or off with a predetermined signal output from the 9$^{th}$ pin of the video card 300-2. The memory 301-1 of the monitor 301 stores monitor information concerning such things as the manufacturer of the monitor, resolution of the monitor, etc. The predetermined signal output from the 9$^{th}$ pin of the video card 300-2 drives the memory 301-1 of the monitor that is currently powered off so that the memory information stored in the memory 301-1 can be read. Accordingly, it is possible to detect the power state of the PC 300 using the level of the predetermined signal output from the 9$^{th}$ pin of the video card 300-2, and thus to control the power of the monitor 301 according to the power state of the PC 300.

The control unit 301-2 of the monitor 301 detects the level of the predetermined signal output from the 9$^{th}$ pin of the video card 300-2 of the PC 300 (402).

If the level of the predetermined signal output from the 9$^{th}$ pin of the video card 300-2 of the PC 300 is 5V, the control unit 301-2 of the monitor 301 determines that the PC 300 is powered on and drives the power supply 301-3 (403 and 404). When the power supply 301-3 is driven, the monitor 301 is powered on.

However, if the level of the predetermined signal output from the 9$^{th}$ pin of the video card 300-2 of the PC 300 is 0V, the control unit 301-2 of the monitor 301 determines that the PC 300 is powered off and stops driving the power supply 301-3 (405). When the power supply 301-3 stops operating, the monitor 301 is powered off.

Figure 5:
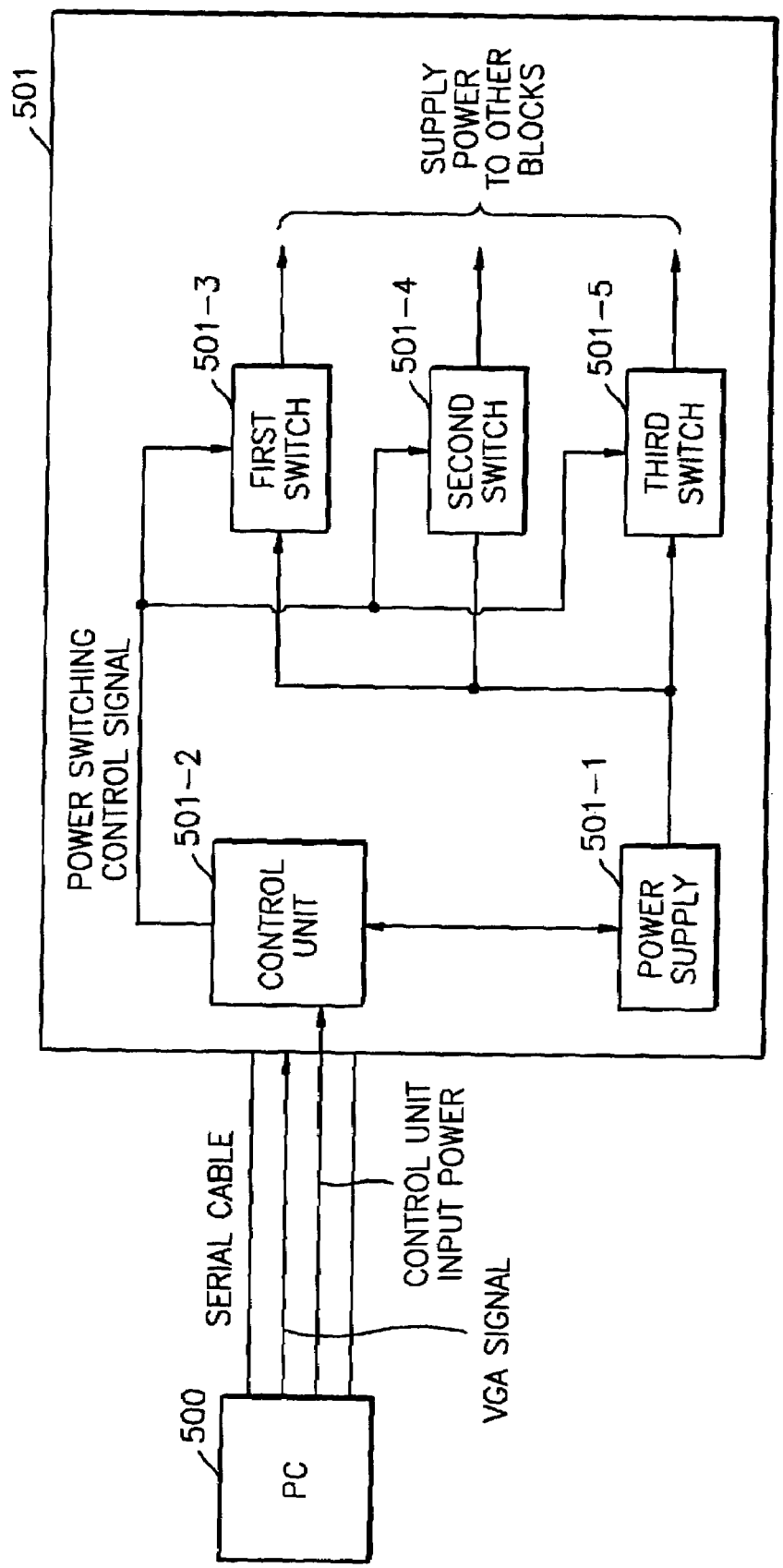
FIG. 5 is a block diagram of a PC system, including a monitor, adopting a monitor power control apparatus according to another embodiment of the present invention.

FIG. 5 is a block diagram of a PC system, including a monitor, adopting a monitor power control apparatus according to another embodiment of the present invention. As shown in FIG. 5, the PC system is comprised of a PC 500, a monitor 501, and a serial cable. In this embodiment, the monitor 501 includes a power supply 501-1, a control unit 501-2, and first, second, and third switches 501-3, 501-4, and 501-5.

When a user powers on the PC 500 and the monitor 501 to use the PC system, the PC 500 transmits VGA signals to the monitor 501 through the serial cable to display the VGA signals via the monitor 501.

In this embodiment, as in the above embodiment, the serial cable is for transmitting the VGA signals produced by the PC 500 to the monitor 501. Conventionally, only the VGA signals have been transmitted from the PC 500 to the monitor 501 through the serial cable. However, in this embodiment, not only the VGA signals are transmitted, a power signal to drive the control unit 501-2 of the monitor 501 is also transmitted through the serial cable. The power signal to drive the control unit 501-2 of the monitor 501 corresponds to the predetermined signal described above with reference to FIGS. 3 and 4. The serial cable includes a number of pins for transmitting the VGA signals, and additional pins that are not used in transmitting the VGA signals. The power signal to drive, or stop driving, the control unit 501-2 of the monitor 501 is transmitted to the control unit 501-2 through any one of the unused additional pins of the serial cable.

When the power of the PC 500 is in a normal mode, the VGA signals and the power signal to drive the control unit 501-2 of the monitor 501 are transmitted to the monitor 501 through the serial cable. The control unit 501-2 receives the VGA signals and controls the monitor 501 to display the VGA signals. The control unit 501-2 keeps operating insofar as the power signal is received. Under the control of the control unit 501-2, the power supply 501-1 supplies power to each block of the monitor 501. In response to the received power signal, the control unit 501-2 outputs a power switching control signal to control the supply of power to each block. The first, second, and third switches 501-3, 501-4, and 501-5 respond to the power switching control signal so that the power can be supplied from the power supply 501-1 to each block.

When the power of the PC 500 is in an abnormal mode, i.e., a DPMS mode or a power off mode, the VGA signals and the power signal to drive the control unit 501-2 of the monitor 501 are not transmitted from the PC 500 to the monitor 501 through the serial cable. Basically, in the DPMS mode, the control unit 501-2 must output the power switching control signal to the first through third switches 501-3, 501-4, and 501-5 to stop the supply of power from the power supply 501-1. However, since the PC 500 does not transmit the VGA signals and the power signal to drive the control unit 501-2, the power supplied to the control unit 501-2 is cut off. Accordingly, the monitor 501 consumes minimal power, i.e., the power consumed by an adapter (not shown). When the PC is in the power off mode, the power supplied to the control unit 501-2 is cut off since the PC 500 does not transmit the VGA signals and the power signal to drive the control unit 501-2. Accordingly, the monitor 501 consumes minimal power, i.e., the power consumed by an adapter (not shown). Thereafter, when the power of the PC 500 returns to the normal mode, the VGA signals and the power signal to drive the control unit 501-2 of the monitor 501 are again transmitted to the monitor and, accordingly, the monitor 501 is normally driven.

Figure 6:
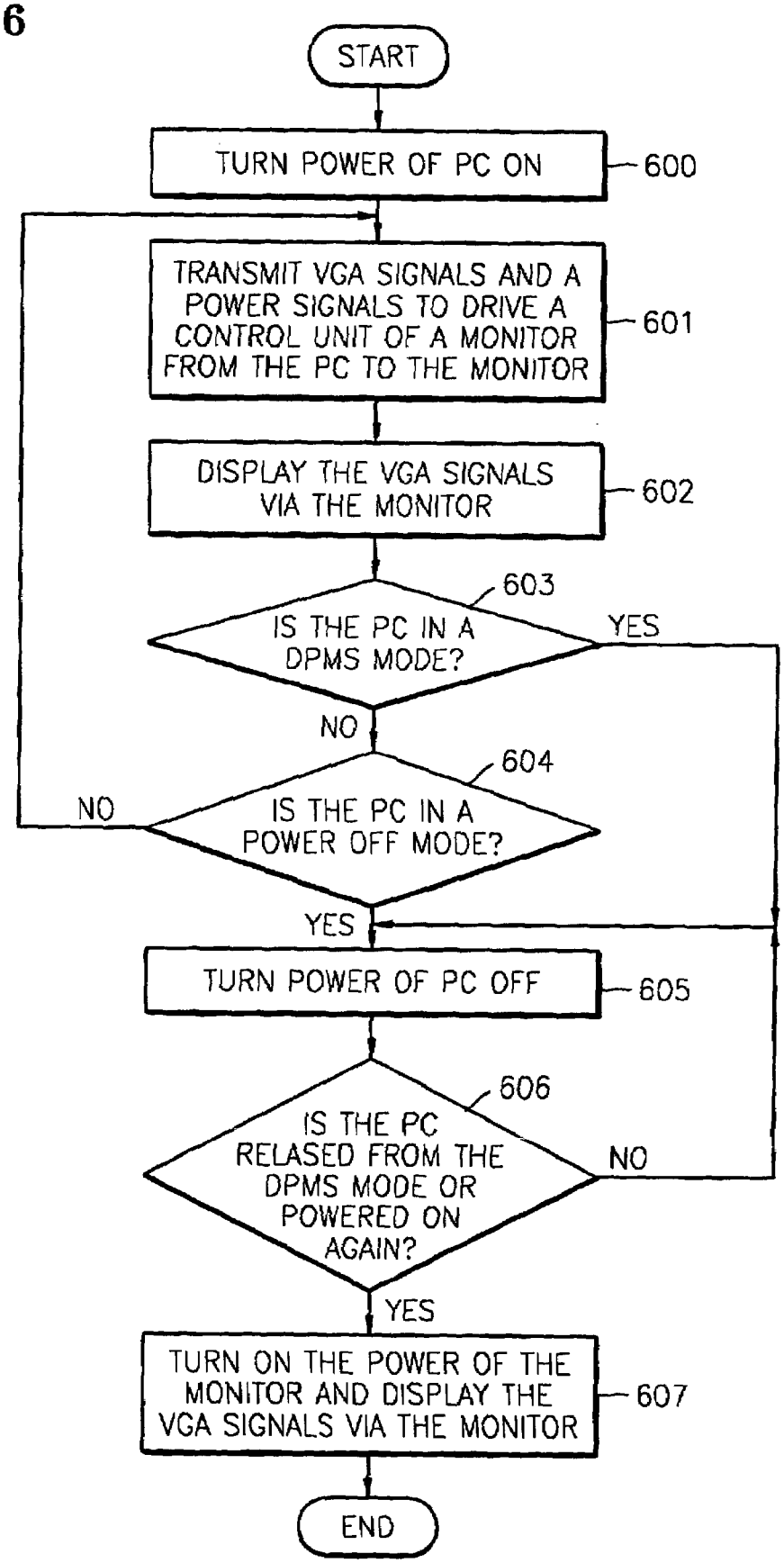
FIG. 6 is a flowchart of a method of controlling the power of a monitor according to another embodiment of the present invention.

Now, a method of controlling the power of a monitor according to this other embodiment of the present invention will be described with reference to FIG. 6 together with FIG. 5.

In order to drive the PC system, a user powers on the PC 500 and the monitor 501 (600).

When the PC 500 and the monitor 501 are powered on, the PC 500 transmits the VGA signals to be displayed to the monitor 501, and the power signal to drive the control unit 501-2 of the monitor 501 (601).

When the power signal to drive the control unit 501-2 is received, the monitor 501 detects that the power of the PC 500 is in a normal mode and displays the VGA signals (602).

The control unit 501-2 determines whether the PC 500 is in a DPMS mode. If the PC is in the DPMS mode, the monitor 501 is powered off (603 and 605). Basically, in the DPMS mode, the control unit 501-2 outputs the power switching control signal to the first through third switches 501-3, 501-4, and 501-5 to stop the supply of power from the power supply 501-1. However, since the PC 500 does not transmit the VGA signals and the power signal to drive the control unit 501-2, the power supplied to the control unit 501-2 is cut off. Accordingly, the monitor 501 consumes minimal power, i.e., the power consumed by an adapter (not shown).

If the PC is not in the DPMS mode, the control unit 501-2 determines whether the PC 500 is in a power off mode. If the PC is in the power off mode, the monitor 501 is powered off (604 and 605). When the PC is in the power off mode, the power supplied to the control unit 501-2 is cut off since the PC 500 does not transmit the VGA signals and the power signal to drive the control unit 501-2. Accordingly, the monitor 501 consumes minimal power, i.e., the power consumed by an adapter (not shown).

Thereafter, it is determined whether the PC 500 is released from the DPMS mode or powered on again. If the PC 500 is released from the DPMS mode, or powered on again, the monitor 501 is again powered on and displays the VGA signals (606 and 607). When the power of the PC 500 returns to the normal mode, the VGA signals and the power signal to drive the control unit 501-2 of the monitor 501 are again transmitted to the monitor, and accordingly, the monitor 501 is normally driven.

As described above, according to the present invention, since a monitor can be powered on and off by switching only the power of a PC on and off, a PC system can be more conveniently used, without needing to separately and manually power the monitor on and off. Further, even when a user forgets to turn the power of the monitor off while turning the power of the PC off, unnecessary power consumption can be avoided since the power of the monitor automatically switches off. Furthermore, the power switch of the monitor can be eliminated since the monitor can be powered on and off by switching only the power of the PC on and off.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for controlling a power of a monitor, comprising:
    a computer selectively outputting a predetermined signal when the computer is powered on and off;
    a monitor comprising a memory separate from a power control unit to control a power supply unit within the monitor, the power control unit receiving the predetermined signal and selectively control powering on and off of the monitor according to the predetermined signal; and
    a video card processing and transmitting a video signal to the monitor;
    wherein the predetermined signal output from the computer is output from a predetermined pin of the video card,
    wherein the predetermined signal is transmitted to the monitor independent of whether the monitor is powered on and independent of whether the monitor is powered off, wherein, when the monitor is powered off, the memory is powered on by the predetermined signal to provide the computer access to monitor information stored in the memory, and
    wherein, when the computer is in a power off mode, the power supplied to the power control unit within the monitor is cut off and the power from a power supply unit within the monitor is also cut off.

2. The apparatus of claim 1, further comprising a serial cable, wherein the predetermined signal is transmitted from the computer to the monitor via the serial cable.

3. An apparatus for controlling a power of a monitor, comprising:
    a computer selectively outputting a predetermined signal when the computer is powered on and off;
    a monitor to receive the predetermined signal and selectively performing powering on and off of the monitor according to the predetermined signal; and
    a video card processing and transmitting a video signal to the monitor;
    wherein the predetermined signal output from the computer is output from a predetermined pin of the video card; and
    wherein the predetermined signal is transmitted to the monitor independent of whether the monitor is powered on and independent of whether the monitor is powered off, so that monitor information in the monitor is accessible by the computer based upon the transmission of the predetermined signal, wherein the monitor comprises:
    a memory storing the monitor information, wherein the monitor information is accessible by the computer, independent of whether the monitor is powered on and independent of whether the monitor is powered off, based upon the transmission of the predetermined signal that, where a level of the predetermined signal is greater than a reference level, the memory is powered on;
    a power control unit to control power supply within the monitor, the power control unit comparing the reference level with the level of the predetermined signal, detecting a state of power of the computer based on a result of the comparison, and outputting a monitor power control signal; and
    a power supply unit within the monitor to perform selective supplying and cutting off of power to the monitor based on the monitor power control signal output from the control unit,
    wherein the memory is separate from the power control unit, and
    wherein, when the computer is in a power off mode, the power supplied to the power control unit within the monitor is cut off and the power from the power supply unit within the monitor is also cut off.

4. The apparatus of claim 3, wherein the predetermined signal drives the memory so that the monitor information stored in the memory is accessible by the computer.

5. The apparatus of claim 3, wherein the power control unit outputs a first control signal to supply power to the monitor in response to the level of the predetermined signal being higher than the reference level, and the power control unit outputs a second control signal to cut off power to the monitor in response to the level of the predetermined signal being lower than the reference level.

6. The apparatus of claim 5, wherein the level of the predetermined signal is 5V in response to the computer being powered on, and 0V in response to the computer being powered off.

7. A method of controlling a power of a monitor, the method comprising:
  receiving, by a power control unit controlling power supply within the monitor, a predetermined signal from a computer based upon the computer being powered; and
  selectively powering the monitor on and off according to the predetermined signal,
  wherein the predetermined signal is transmitted to the monitor independent of whether the monitor is powered on and independent of whether the monitor is powered off,
  wherein the receiving of the predetermined signal includes the power control unit supplying power from the predetermined signal to a memory in the monitor, separate from the power control unit, storing monitor information, so that the monitor information in the memory is accessible by the computer based upon the predetermined signal by powering on the memory when the monitor is powered off, and
  wherein, when the computer is in a power off mode, the power supplied to the power control unit within the monitor is cut off and the power from a power supply unit within the monitor is also cut off.

8. The method of claim 7, wherein the powering on and off of the monitor further comprises:
  detecting a level of the received predetermined signal;
  supplying power to the monitor in response to the level of the predetermined signal being higher than a reference level; and
  cutting off power to the monitor in response to the level of the predetermined signal being lower than the reference level.

9. An apparatus for controlling a power of a monitor comprising:
  a memory storing a monitor information, the monitor information being accessible by a computer, independent of whether the monitor is powered on and independent of whether the monitor is powered off, by powering on the memory when the monitor is powered off based on a transmission of a predetermined signal;
  a power control unit to control a supply of power within the monitor, the power control unit comparing a reference level with a level of the predetermined signal, detecting a state of power of the computer based on a result of the comparison, and outputting a monitor power control signal; and
  a power supply unit within the monitor to perform selective supplying and cutting off of power to the monitor based on the monitor power control signal output from the power control unit,
  wherein the memory is separate from the power control unit,
  wherein the predetermined signal is output when the computer is powered on and off and the monitor selectively performs powering on and off according to the predetermined signal, and
  wherein, when the computer is in a power off mode, the power supplied to the power control unit is cut off and the power from the power supply unit within the monitor is also cut off.

* * * * *

UNITED STATES PATENT AND TRADEMARK OFFICE
CERTIFICATE OF CORRECTION

PATENT NO.      : 7,664,975 B2                                         Page 1 of 1
APPLICATION NO. : 10/679293
DATED           : February 16, 2010
INVENTOR(S)     : Oh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this

Twenty-eighth Day of December, 2010

David J. Kappos
*Director of the United States Patent and Trademark Office*